(12) United States Patent
Lee et al.

(10) Patent No.: US 7,639,797 B2
(45) Date of Patent: Dec. 29, 2009

(54) APPARATUS AND METHOD OF PERFORMING AES RIJNDAEL ALGORITHM

(75) Inventors: Kyung-hee Lee, Yongin-si (KR); Chae-hoon Lim, Seongnam-si (KR); Tymur Korkishko, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 960 days.

(21) Appl. No.: 11/000,496

(22) Filed: Dec. 1, 2004

(65) Prior Publication Data

US 2005/0135607 A1 Jun. 23, 2005

(30) Foreign Application Priority Data

Dec. 1, 2003 (KR) .................. 10-2003-0086560

(51) Int. Cl.
*H04K 1/00* (2006.01)
(52) U.S. Cl. ....................................... 380/28
(58) Field of Classification Search ............ 380/28
See application file for complete search history.

(56) References Cited

U.S. PATENT DOCUMENTS

| | | | |
|---|---|---|---|
| 2003/0198345 A1* | 10/2003 | Van Buer | 380/43 |
| 2004/0047466 A1* | 3/2004 | Feldman et al. | 380/37 |
| 2004/0202317 A1* | 10/2004 | Demjanenko et al. | 380/28 |
| 2006/0109981 A1* | 5/2006 | Sexton | 380/28 |

OTHER PUBLICATIONS

"A Method to Implement Block Ciphers in Reconfigurable Hardware and its Application to Fast and Compact AES Rijndael" Standaert et al. Published Feb. 23-25, 2003 © 2003 ACM.*

(Continued)

*Primary Examiner*—Kimyen Vu
*Assistant Examiner*—Thomas Gyorfi
(74) *Attorney, Agent, or Firm*—Staas & Halsey LLP

(57) ABSTRACT

An encryption and decryption apparatus includes a round key generator generating at least one round key for iterative operations in each of a plurality of rounds using an input key for one of the encryption and decryption; an initial round key adder receiving a plurality of divided parts of an input data, consecutively receiving a plurality of parts of an initial round key which is output from the round key generator for an initial round and corresponds to each of the divided input data, and adding the input data and the corresponding part of the initial round key; a first operator receiving a first data which is output from the initial round key adder and a part of the round key which is output from the round key generator and performing operations for one of the encryption and decryption; a second operator receiving a second data which is output from the initial round key adder and another part of the round key which is output from the round key generator, and performing operations for one of the encryption and decryption; and a register part temporarily storing the first data which is output from the first operator and the second data which is output from the second operator, inputting the first and second data to the first and second operators, respectively, for operations of a next round among the plurality of the rounds, and outputting an encrypted or decrypted data when the plurality of the rounds are completed.

31 Claims, 5 Drawing Sheets

OTHER PUBLICATIONS

"Unlocking the Design Secrets of a 2.29GB/s Rijndael Processor" Schaumont et al. Published Jun. 10-14, 2002 © 2002 ACM.*

"AES and the Cryptonite Crypto Processor" Oliva et al. Published Oct. 30-Nov. 1, 2003 © 2003 ACM.*

Wikipedia article for "64-bit" published Nov. 16, 2003 http://en.wikipedia.org/w/index.php?title=64-bit&oldid=1917574.*

A. Panato et al. "A Low Device Occupation IP to Implement Rijndael Algorithm" Proceedings of the Design, Automation, and Test in Europe Conference and Exhibition. © 2003 IEEE. (6 pages).*

A. Satoh et al. "A Compact Rijndael Hardware Architecture with S-Box Optimization" © 2001 Springer-Verlag Berlin Heidelberg. pp. 239-254.*

* cited by examiner

FIG. 1
(PRIOR ART)

| | 101 | | |
|---|---|---|---|
| $In_0$ | $In_4$ | $In_8$ | $In_{12}$ |
| $In_1$ | $In_5$ | $In_9$ | $In_{13}$ |
| $In_2$ | $In_6$ | $In_{10}$ | $In_{14}$ |
| $In_3$ | $In_7$ | $In_{11}$ | $In_{15}$ |

| | 102 | | |
|---|---|---|---|
| $S_{00}$ | $S_{01}$ | $S_{02}$ | $S_{03}$ |
| $S_{10}$ | $S_{11}$ | $S_{12}$ | $S_{13}$ |
| $S_{20}$ | $S_{21}$ | $S_{22}$ | $S_{23}$ |
| $S_{30}$ | $S_{31}$ | $S_{32}$ | $S_{33}$ |

| | 103 | | |
|---|---|---|---|
| $Out_0$ | $Out_4$ | $Out_8$ | $Out_{12}$ |
| $Out_1$ | $Out_5$ | $Out_9$ | $Out_{13}$ |
| $Out_2$ | $Out_6$ | $Out_{10}$ | $Out_{14}$ |
| $Out_3$ | $Out_7$ | $Out_{11}$ | $Out_{15}$ |

APPARATUS AND METHOD OF PERFORMING AES RIJNDAEL ALGORITHM

CROSS-REFERENCE TO RELATED APPLICATIONS

This application claims the benefit of Korean Patent Application No. 2003-86560, filed on Dec. 1, 2003 in the Korean Intellectual Property Office, the disclosure of which is incorporated herein by reference in its entirety.

BACKGROUND OF THE INVENTION

1. Field of the Invention

The present invention relates generally to an apparatus and a method of performing the advanced encryption standard (AES) Rijndael algorithm. More specifically, the present invention is directed to an apparatus and a method of implementing the Rijndael algorithm in a hardware, which can rapidly perform an encryption by dividing data into blocks for parallel-processing operations.

2. Description of the Related Art

The Rijndael algorithm has been selected as the Advanced Encryption Standard (AES) for performing an encryption of documents and data information which are transmitted through a network or stored into a smart card or a computer storage. According to the AES, the Rijndael algorithm is a symmetric block cipher that can process data blocks of 128 bits, using cipher keys with lengths of 128, 192, and 256 bits, and outputs 128-bit encrypted data. Other block sizes are possible in addition to 128-bit blocks, but the AES selected 128 bits.

FIG. 1 illustrates structures of an input data, a state array that is transformed from the input data, and an encrypted or decrypted output data according to the conventional Rijndael algorithm.

Referring to FIG. 1, the input data 101, the state array 102, and the output data 103 of 128 bit blocks are structured with four rows of 32 bits each. The input data 101 are encrypted or decrypted to generate the output data 103. The state array 102 is generated by executing the encryption or decryption operations on the input data 101.

In general, the AES Rijndael algorithm is iteratively performed in, what is called, the number of rounds. FIGS. 2A and 2B are flowcharts of a round of the general Rijndael algorithm.

Referring to FIG. 2A, an input state array is processed by several operations which are called AES rounds. The input state array is processed by a byte substitution operation at operation S201, a shiftrow operation at operation S203, a mixed columns operation at operation S205, and a round key addition operation at operation S207, thus performing one AES round.

The byte substitution operation at operation S201 is a non-linear byte substitution that independently operates on each byte of the data using a substitution table which is called S-box. The S-box is constructed by the multiplicative inverse in the finite field Galois Field (GF) GF(28) and the affine transformation over GF(28).

The shiftrow operation at operation S203 shifts positions of the last three rows, excluding the first row, of the state array 102 without changing the byte values. The mix columns operation at operation S205 treats elements of each column of the state array 102 as a coefficient of a four-term, order-3 polynomial over GF(28), and transforms the coefficients of the four-term polynomial corresponding to a remainder obtained by multiplying the polynomial by a fixed polynomial $a(x)=\{03\}x^3+\{01\}x^2+\{01\}x+\{02\}$ and dividing by $x^4+1$.

The round key addition operation at operation S207 adds a round key to the state data 102 by a simple bit-wise exclusive-or (XOR) operation. Specific operations of the round of the AES Rijndael algorithm are well-known technologies, and thus, the detailed descriptions are omitted for conciseness.

FIG. 2B illustrates an alterative AES round. Referring to FIG. 2B, the alternative AES round includes a shiftrow operation S211, a byte substitution operation S213, a mixed columns operation S215, and a round key addition operation S217.

The alternative AES round of FIG. 2B has the same operations as the AES round of FIG. 2A. The only difference lies in that the order of the shiftrow operation S211 and the byte substitution operation S213 are switched. The alternative AES round of FIG. 2B acquires the same results as the AES round of the FIG. 2A since the switch of the shiftrow operation S211 and the byte substitution operation S213 produces the same results.

According to the AES algorithm, the data encryption is performed by processing the AES round for a predetermined number of times. The number of the AES rounds Nr depends on a cipher key length. Specifically, the Nr is "10" for a 128-bit cipher key, "12" for a 192-bit cipher key, and "14" for a 256-bit cipher key.

After the predetermined number of the AES rounds are iteratively processed, a final AES round includes the shiftrow operation S211 and the byte substitution operation S213 (or vice versa) followed by the round key addition operation S217 while omitting the mixed columns operation S215, to thus generate the output data 103 of FIG. 1.

The AES Rijndael decryption algorithm is a reverse order of the AES Rijndael encryption algorithm. Accordingly, the decryption of the input data is performed through the inverse byte substitution operation, the inverse shiftrow operation, the inverse mix columns operation, and the round key addition operation S207. The alternative AES decryption is similar to the AES Rijndael decryption, thus the detailed description thereof is omitted for conciseness.

A number of apparatuses have been devised to implement the AES Rijndael algorithm. For example, an apparatus to implement the conventional AES Rijndael algorithm uses only one data processing module to implement all the rounds. Hence, Nr-ary rounds denote that the data processing module performs operations for a single data Nr times. As a result, a time for performing the entire rounds is Nr times as long as a time for performing one round.

Since the AES Rijndael algorithm requires the additional round key addition operation at the first round execution, the conventional Rijndael algorithm implementation apparatus of iterative loop architecture requires an additional process to operate the data processing module, thus decreasing throughput of the Rijndael algorithm implementation apparatus.

The conventional Rijndael algorithm implementation apparatus processes a single state array as a whole, and accordingly, requires more resources to configure the data processing modules so as to perform the operations with respect to the whole 128-bit data.

When the AES Rijndael algorithm implementation apparatus is used in a resource-constrained environment, such as a smart card, a certain level of processing speed should be maintained while keeping the scale of the apparatus small. Thus, the data input to the AES Rijndael apparatus and the data processing are not executed at the same time. In addition, the data processing speed is deteriorated since the data processing modules have to stand by during the data input.

SUMMARY OF THE INVENTION

An aspect of the present invention is to provide an apparatus and a method for implementing the AES Rijndael algorithm in a resource-constrained environment by simultaneously executing data input and data processing through parallel-processing AES rounds using a plurality of input data handling routines.

According to an aspect of the present invention, the encryption and decryption apparatus includes a round key generator generating at least one round key for iterative operations in each of a plurality of rounds using an input key for one of the encryption and decryption; an initial round key adder receiving a plurality of divided part of an input data, consecutively receiving a plurality of part of an initial round key which is output from the round key generator for an initial round and corresponds to each of the divided input data, and adding the input data and the corresponding part of the initial round key; a first operator receiving a first data which is output from the initial round key adder and a part of the round key which is output from the round key generator and performing operations for one of the encryption and decryption; a second operator receiving a second data which is output from the initial round key adder and another part of the round key which is output from the round key generator, and performing operations for one of the encryption and decryption; and a register part temporarily storing the first data which is output from the first operator and the second data which is output from the second operator, inputting the first and second data to the first and second operators, respectively, for operations of a next round among the plurality of the rounds, and outputting an encrypted or decrypted data when the plurality of the rounds are completed.

According to an aspect of the present invention, the first and second operators perform the operations according to a Rijndael encryption or decryption algorithm. The first operator includes a first byte substitution part receiving any one of output data from the initial round key adder and the register part and performing one of a Rijndael byte substitution operation and a Rijndael inverse byte substitution operation for one of the encryption or decryption; a first column mixer receiving an output data from the first byte substitution part and performing one of a Rijndael mixed columns operation and a Rijndael inverse mixed columns operation for the encryption and decryption; and a first round key adder receiving any one of output data from the first column mixer and the first byte substitution part, receiving a part of the round key from the round key adder, and performing a round key addition operation.

According to an aspect of the present invention, the first operator further includes a first selector which receives output data from the initial round key adder and the register part and selectively inputs any one of the output data to the first byte substitution part. The first operator further includes a third selector which receives output data from the first column mixer and the first byte substitution part and selectively inputs the output data to the first round key adder.

According to an aspect of the present invention, the third selector selects and inputs the output data of the first byte substitution part to the first round key adder at a final round among the plurality of the round. The second operator includes a second byte substitution part receiving output data of the register part and performing one of a Rijndael byte substitution operation and a Rijndael inverse byte substitution operation for the encryption and decryption; a second column mixer receiving output data of the initial round key adder and performing a Rijndael mixed columns operation or a Rijndael inverse mixed columns operation for the encryption and decryption; and a second round key adder receiving any one of output data from the first operator and the second column mixer, receiving a part of the round key from the round key adder, and performing a round key addition operation.

According to an aspect of the present invention, the second operator further includes a second selector which receives output data from the second column mixer and the second byte substitution part and selectively inputs any one of the output data to the second round key adder. The second selector selects and inputs the output data of the second byte substitution part to the second round key adder at a final round among the plurality of the rounds.

According to an aspect of the present invention, the register part includes at least one register storing an input data, and a selector receiving data from the register and selectively outputting the data. The register part includes first to sixteenth registers.

According to an aspect of the present invention, the first to fourth registers receive output data from the first operator, and the fifth to eighth registers receive output data from the second operator. The data stored in the first to eight registers are input to the ninth to sixteenth registers.

According to an aspect of the present invention, the data stored in the ninth to sixteenth registers are processed through a Rijndael shiftrow operation by the selector, an output data of the selector is input to the first operator and the second operator. The a size of the input data is 128 bits, and the input data is divided into four 32-bit columns and is consecutively input to the initial round key adder.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a diagram illustrating structures of an input data, a state array which is transformed from the input data, and an encrypted or decrypted output data according to a conventional Rijndael algorithm;

DETAILED DESCRIPTION OF THE EMBODIMENTS

Figure 2A:
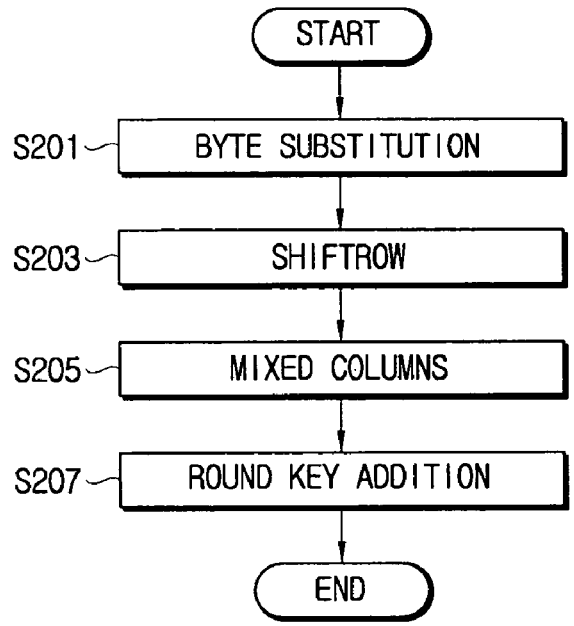
FIGS. 2A and 2B are flowcharts illustrating operations of the conventional Rijndael algorithm.
Figure 2B:
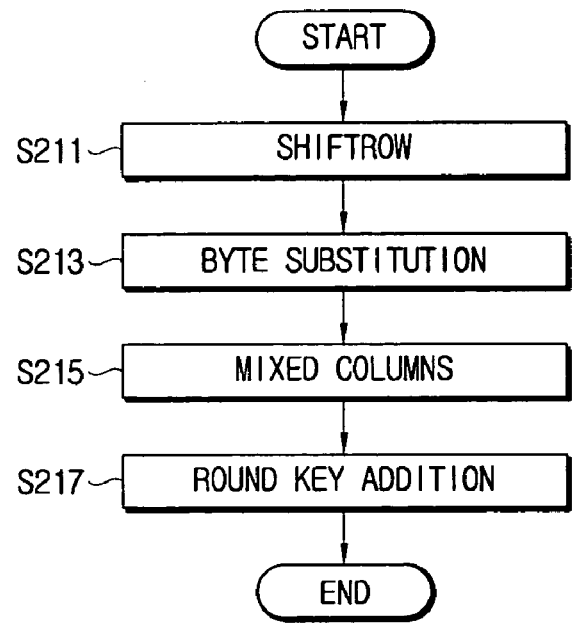

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
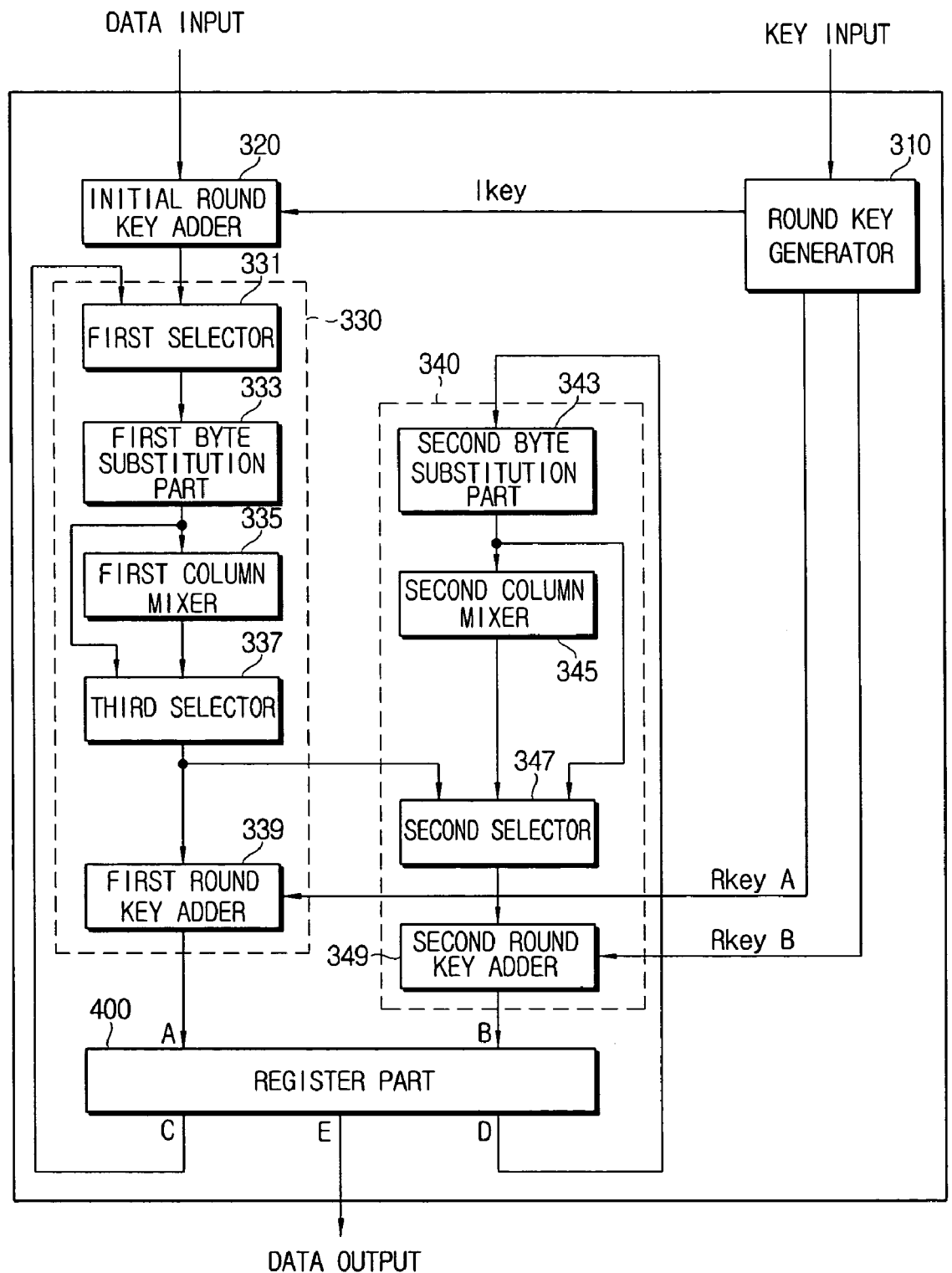
FIG. 3 is a block diagram illustrating an encryption and decryption apparatus implementing the Rijndael algorithm according to an embodiment of the present invention.

FIG. 3 is a block diagram of an apparatus implementing the Rijndael algorithm according to an embodiment of the present invention, which is described in detail below.

Referring to FIG. 3, the Rijndael algorithm implementation apparatus includes a round key generator 310, an initial round key adder 320, a first operator 330, a second operator 340, and a register part 400.

The round key generator 310 receives a key input from an external source and outputs the input key to the initial round key adder 320, for example, by 32 bits, at an initial round. The round key generator 310 generates round keys corresponding to each round by processing the input key, outputs the round key RKey A of, for example, 32 bits to the first operator 330, and outputs the round key RKey B of 32 bits to the second operator 340 from a first round.

The initial round key adder 320 receives a part of data for encryption and decryption and a part of the round key output from the round key generator 310, and performs addition operations through an XOR operation bit by bit. If the input data is 128 bits, the part of the input data of the initial round key adder 320 may be, for example, 32 bits. Accordingly, the input data 101 of FIG. 1 is input to the initial round key adder 320 by the row or by the column in sequential order.

An example case when the part of the data, which is input for the encryption and decryption at one time, is 32 bits. If the input data is 32 bits, the round key output from the round key generator 310 at a time is the same 32 bits as the input data.

The first operator 330 and the second operator 340 perform operations for the encryption and the decryption. The first operator 330 includes a first selector 331, a first byte substitution part 333, a first column mixer 335, a third selector 337, and a first round key adder 339. The second operator 340 includes a second byte substitution part 343, a second column mixer 345, a second selector 347, and a second round key adder 349.

The first selector 331 selectively inputs to the first byte substitution part 333 any one of the data output from the initial round key adder 320 or data from the register part 400. Thus, the new data input and the round operations on the input data are processed together in the first operator 330.

The first byte substitution part 333 receives the data output from the first selector 331 and performs a Rijndael byte substitution operation for the encryption or a Rijndael inverse substitution operation for the decryption. The data output from the first byte substitution part 333 is input to the first column mixer 335 or the third selector 337.

The first column mixer 335 performs a mixed columns or an inverse mixed columns operation of the Rijndael algorithm on each column of the input data from the first byte substitution part 333. The data output from the first column mixer 335 is input to the third selector 337.

The third selector 337 receives the data output from the first column mixer 335 and the first byte substitution part 333, selects one of the output data, and selectively inputs the selected data to the first round key adder 339 or the second operator 340. The first round key adder 339 adds the data input from the third selector 337 and the round key Rkey A input from the round key generator 310 by performing the bit-wise XOR operation. The output data of the first round key adder 339 is input to the register part 400. The register part 400 stores the data for a predetermined time, performs shift operations of the Rijndael algorithm, and inputs the data to the first selector 331, thus executing second round operations.

The second selector 347 of the second operator 340 receives and selectively inputs the data output from the third selector 337 of the first operator 330 and the data from the second byte substitution part 343 and the second column mixer 345, to the second round key adder 349.

The second round key adder 349 receives the data output from the second selector 347 and the round key output from the round key generator 310, and performs addition operations through the bit-wise XOR operation. The data output of the second round key adder 349 is input to the register part 400, to end the round operation. The register part 400 stores the data for a predetermined number of times, performs the Rijndael shift operation, and inputs the data to the second byte substitution part 343, thus executing a next round operation.

The second byte substitution part 343 receives the data output from the register part 400 and performs either the byte substitution operation for the encryption or the inverse byte substitution operation for the decryption. The output data of the second byte substitution part 343 is input to the second column mixer 345 or the second selector 347.

The second column mixer 345 performs either a mixed column or an inverse mixed column operation of the Rijndael algorithm on each column of the data input from the second byte substitution part 343. The output data of the second column mixer 345 is input to the second selector 347.

Figure 4:
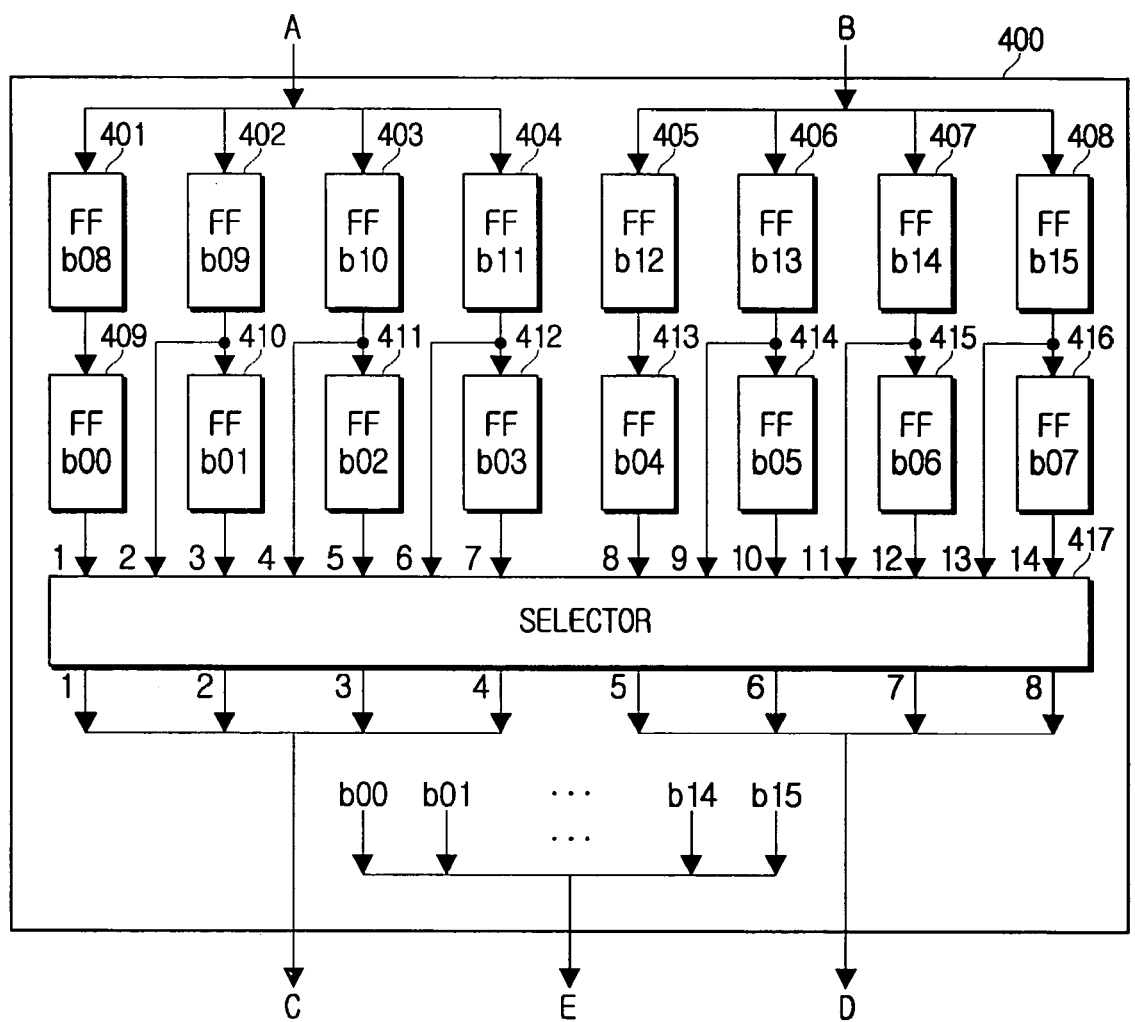
FIG. 4 is a block diagram illustrating the register part of FIG. 3.

FIG. 4 is a block diagram illustrating the register part of FIG. 3. Referring to FIG. 4, the register part 400 includes first to eighth registers 401 to 408, ninth to sixteenth registers 409 to 416, and a selector 417.

The first to sixteenth registers 401 to 416 store data which are output after performing all the operations of one round with respect to the input data. The first to fourth registers 401 to 404 are input with the output data from the first round key adder 339. The fifth to eighth registers 405 to 408 are input with the output data from the second round key adder 349.

Specifically, the first column of the state array is input to the first to fourth registers 401 to 404, and the second column of the state array is input to the fifth to eighth registers 405 to 408. When the third column of the state array is input, the previous first column of the state array stored in the first to fourth registers 401 to 404 is output to and stored in the ninth to twelfth registers 409 to 412, and the third column of the state array is stored in the first to fourth registers 401 to 404.

When the fourth column of the state array is input, the previous second column of the state array stored in the fifth to eighth registers 405 to 408 is output to and stored in the thirteenth to sixteenth registers 413 to 416, and the fourth column of the state array is stored in the fifth to eighth registers 405 to 408.

The selector 417 receives the data output from the ninth to sixteenth registers 409 to 416, the data stored in the second to fourth registers 402 to 404, and the data stored in the sixth to eighth data 406 to 408.

When the entire rounds of the Rijndael operations are completed for the Rijndael encryption and decryption, either the encrypted or decrypted data are output directly from the first to sixteenth registers 401 to 416 without passing through the selector 417, which is indicated as E of FIG. 4.

Figure 5:
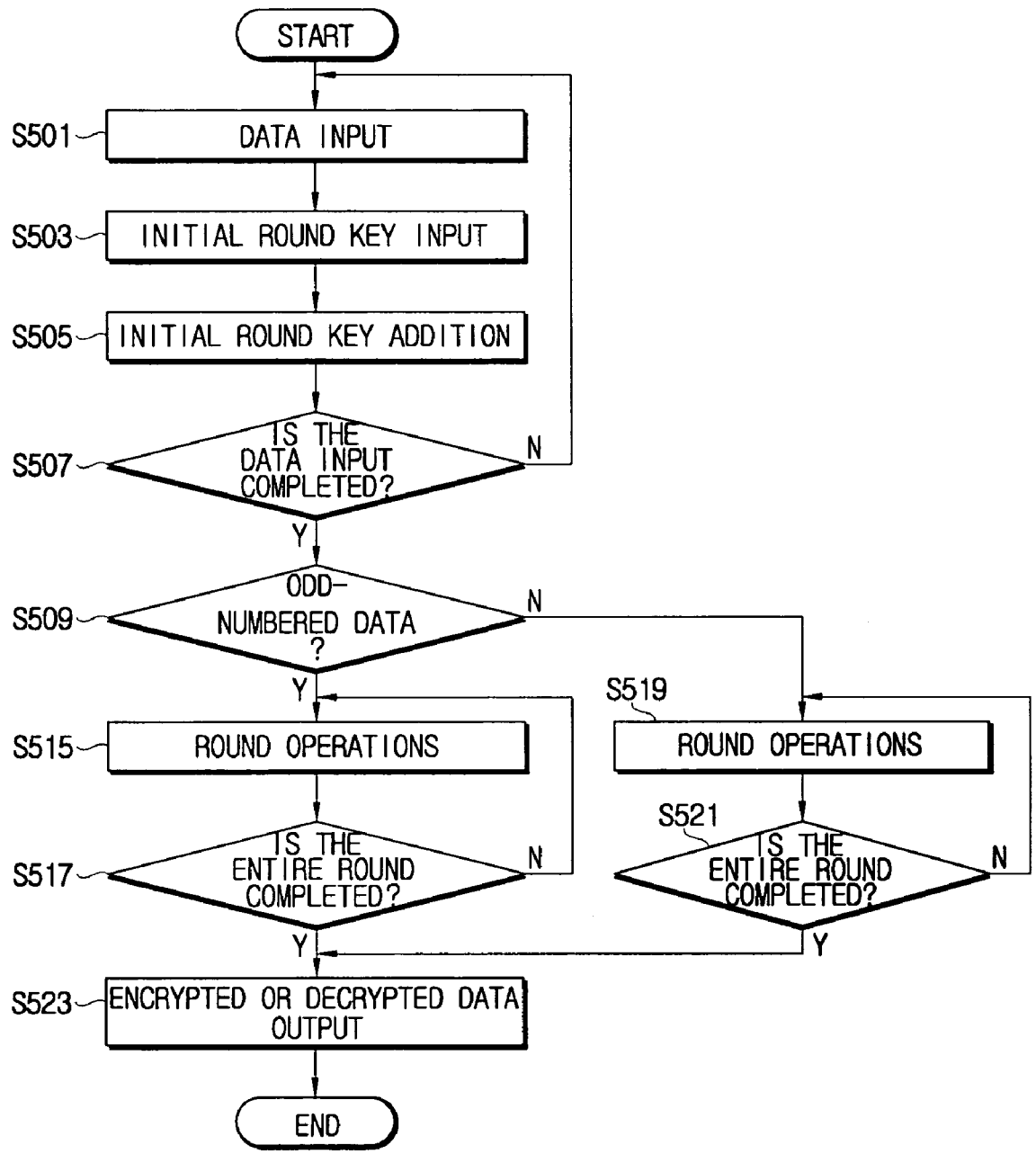
FIG. 5 is a flowchart illustrating exemplary operations of the encryption and decryption apparatus implementing the Rijndael algorithm according to an embodiment of the present invention.

FIG. 5 is a flowchart illustrating exemplary operations of the encryption and decryption apparatus implementing the Rijndael algorithm according to an embodiment of the present invention, which is described in detail below.

If the initial round begins according to the Rijndael algorithm, data to be encrypted or decrypted is loaded and input to the initial round key adder 320 at operation S501. The input data is a part of 128-bit data, such as, for example, a 32-bit data array. That is, the input data corresponds to a single column or row of the input data 101 of FIG. 1.

The round key generator 310 receives the initial key value from the external source and supplies the initial round key adder 320 with the initial round key for the initial round at operation S503. The initial round key IKey, which is input to the initial round key adder 320, corresponds to the size of data input to the initial round key adder 320 and is the part of the entire initial round keys. According to an embodiment of the present invention, the initial round key IKey corresponds to 32 bits.

The initial round key adder 320 adds the input data and the initial round key at operation S505. The data to be encrypted or decrypted is configured, for example, as the input data 101 of FIG. 1. After the first column of the input data 101 is input to and added by the initial round key adder 320, the next column of the input data 101 is processed until the last column of the input data 101 is input and added. Until the whole input data 101 is completely input at operation S507, the data is consecutively input to and added by the initial round key adder 320.

Depending on the order of the data output from the initial round key adder 320 with respect to the whole data to be encrypted or decrypted, that is, depending on which column of the input data 101 the output data corresponds to at operation S509, the Rijndael algorithm implementation apparatus processes the operations of each round of the Rijndael algorithm following separate routines. Specifically, the input data 101 is divided into a plurality of parts and the divided parts are input in order. Depending on the data input order, the operations of each round are divided into two routines to be performed.

The encryption and decryption apparatus implementing the Rijndael algorithm according to an embodiment of the present invention has two separate operation routines in which the first operator 330 and the second operator 340 are respectively operated, and constituents in each operation routine are independently operated. Accordingly, the operations of each round are performed in parallel following the two separate routines. The round operations of odd-numbered data are processed by the first operator 330 at operation S515, and those of even-numbered data are processed by the second operator 340 at operation S519. When the first and second operators 330 and 340 complete the round operations of the Rijndael algorithm following the two separate routines at operations S517 and S521, either the encrypted or decrypted data is output at operation S523. Table 1 shows constituents of the encryption and decryption apparatus, which perform in each round of the Rijndael operation and in each cycle according to an embodiment of the present invention.

TABLE 1

| Round | Cycle | Constituents |
|---|---|---|
| 1 (initial) | 0 | Initial round key adder 320 |
| | | First byte substitution part 333 |
| | | First column mixer 335 |
| | | First round key adder 339 |
| | | Register part 400 |
| | 1 | Initial round key adder 320 |
| | | First byte substitution part 333 |
| | | First column mixer 335 |
| | | Second round key adder 349 |
| | | Register part 400 |
| | 2 | Initial round key adder 320 |
| | | First byte substitution part 333 |
| | | First column mixer 335 |
| | | First round key adder 339 |

TABLE 1-continued

| Round | Cycle | Constituents |
|---|---|---|
| | | Register part 400 |
| | 3 | Initial round key adder 320 |
| | | First byte substitution part 333 |
| | | First column mixer 335 |
| | | Second round key adder 349 |
| | | Register part 400 |
| 2 | 4 | First byte substitution part 333 |
| | | First column mixer 335 |
| | | First round key adder 339 |
| | | Second byte substitution part 343 |
| | | Second column mixer 345 |
| | | Second round key adder 349 |
| | | Register part 400 |
| | 5 | First byte substitution part 333 |
| | | First column mixer 335 |
| | | First round key adder 339 |
| | | Second byte substitution part 343 |
| | | Second column mixer 345 |
| | | Second round key adder 349 |
| | | Register part 400 |
| | ... | |
| Nr − 1 | (Nr − 1) * 2 | First byte substitution part 333 |
| | | First column mixer 335 |
| | | First round key adder 339 |
| | | Second byte substitution part 343 |
| | | Second column mixer 345 |
| | | Second round key adder 349 |
| | | Register part 400 |
| | (Nr − 1) * 2 + 1 | First byte substitution part 333 |
| | | First column mixer 335 |
| | | First round key adder 339 |
| | | Second byte substitution part 343 |
| | | Second column mixer 345 |
| | | Second round key adder 349 |
| | | Register part 400 |
| Nr | (Nr − 1) * 2 + 2 | First byte substitution part 333 |
| | | First round key adder 339 |
| | | Second byte substitution part 343 |
| | | Second round key adder 349 |
| | | Register part 400 |
| | (Nr − 1) * 2 + 3 | First byte substitution part 333 |
| | | First round key adder 339 |
| | | Second byte substitution part 343 |
| | | Second round key adder 349 |
| | | Register part 400 |

At the initial round, the data loading and the data input, and the initial round operations are performed at the same time. The first column of the input data 101 is supplied to the first byte substitution part 333 via the initial round key adder 320, in which either the byte substitution operation for the encryption or the inverse byte substitution operation for the decryption of the Rijndael algorithm is executed. Next, the first column is passed through the first column mixer 335 and the first round key adder 339, and stored in the first to fourth registers 401 to 404 of the register part 400.

During the process of the round operations on the first column of the input data 101, the second column of the input data 101 is input and supplied to the first byte substitution part 333 via the initial round key adder 320, in which either the Rijndael byte substitution operation for the encryption or the Rijndael inverse byte substitution operation for the decryption is executed. After performing the column mix operation in the first column mixer 335, the second column is output from the third selector 337 to the second selector 347, is added with the round key in the second round key adder 349, and is stored in the fifth to eighth registers 405 to 408 of the register part 400.

During the process of the round operations on the second column of the input data 101, the third column of the input data 101 is passed through the same routine as the first column of the input data 101 and is stored in the first to fourth registers 401 to 404 of the register part 400. The previous first column of the input data 101 stored in the first to fourth registers 401 to 404 is output and stored in the ninth to twelfth registers 409 to 412.

During the process of the round operations on the third column of the input data 101, the fourth column of the input data 101 is consecutively input, passed through the same routine as the second column of the input data 101, and stored in the fifth to eighth registers 405 to 408 of the register part 400. The previous second column of the input data 101 stored in the fifth to eighth registers 405 to 408 is output and stored in the thirteenth to sixteenth registers 413 to 416.

Table 2 shows outputs of the register part 400 at each cycle according to types of the Rijndael operation.

TABLE 2

| Rijndael operation | Cycle | Outputs of the selector 417 | | | | | | | |
|---|---|---|---|---|---|---|---|---|---|
| | | 1 | 2 | 3 | 4 | 5 | 6 | 7 | 8 |
| Encryption | 1 | b00 | b05 | b10 | b15 | b04 | b09 | b14 | b03 |
| | 2 | | | b02 | b07 | | b01 | b06 | |
| Decryption | 1 | | b13 | b10 | | | | b14 | |
| | 2 | | b05 | b02 | | | | b06 | b11 |

In the first cycle, the register part 400 performs either the Rijndael shiftrow operation or the Rijndael inverse shiftrow operation, the first column of the state array is output as the outputs of the first to fourth registers 401 to 404, and the second column of the state array is output as the outputs of the fifth to eighth registers 405 to 408 of the register part 400 according to Table 2. The first operator 330 performs either the Rijndael encryption or decryption operation on the output first column of the state array, and the second operator 304 performs either the Rijndael encryption or decryption operation on the output second column of the state array.

In the second cycle for the encryption operation, the previous third and fourth columns, which are stored in the first to eighth registers 401 to 408 of the register part 400, are stored in the ninth to sixteenth registers 409 to 416. In more detail, values in the first register 401 and the fourth to sixth registers 404 to 406 are stored in the ninth register 409 and the twelfth to fourteenth registers 412 to 414, respectively. The tenth register 410, the eleventh register 411, the fifteenth register 415, and the sixteenth register 416 preserve the stored value.

In the second cycle for the encryption operation, the Rijndael shiftrow operation is performed, the third column of the state array is output as first to fourth outputs of the register part 400, and the fourth column of the state array is output as fifth to eighth outputs of the register part 400. Hence, the first operator 330 performs the Rijndael encryption operation on the third column of the state array, and the second operator 340 performs the Rijndael operation on the fourth column of the state array.

In the second cycle for the decryption operation, the third and fourth columns in the first to eighth registers 401 to 408 of the register part 400 are stored in the ninth to sixteenth registers 409 to 416. Values in the first register 401, the second register 402, the fifth register 405, and the eighth register 408 are stored in the ninth register 409, the tenth register 410, the thirteenth register 413, and the sixteenth register 416. The eleventh register 411, the twelfth register 412, the fourteenth register 414, and the fifteenth register 415 preserve the stored value. Hence, the first operator 330 performs the Rijndael decryption operation on the third column, and the second operator 340 performs the Rijndael decryption operation on the fourth column of the state array.

In the second cycle for the decryption operation, the Rijndael inverse shiftrow operation is performed, the third column of the state array is output as first to fourth outputs of the register part 400, and the fourth column of the state array is output as fifth to eighth outputs of the register part 400. The first operator 330 performs the Rijndael decryption operation on the third column of the state array, and the second operator 340 performs the Rijndael decryption operation of the fourth column of the state array.

The register part 400 stores the data and performs the shiftrow operation or the inverse shiftrow operation in the first and second cycles to thus enable either the Rijndael encryption or decryption operation. Thus, the register part 400 allows the simultaneous processing of the data loading and input, and the Rijndael operations at the Rijndael initial round.

At the final round of the Rijndael algorithm, the data of the first and the second operators 330 and 340 are not processed through the first and second column mixers 335 and 345. Thus, the output data of the first byte substitution part 333 is input to the third selector 337 and the second byte substitution part 343 is input to the second selector 347.

In the light of the foregoing, the round operations are iteratively executed for the predetermined times of Nr-ary rounds, and the final encrypted or decrypted output data 103 is output from the register part 400.

The Rijndael encryption or decryption apparatus implementing the Rijndael algorithm according to an embodiment of the present invention, has the two separate routines to process each round operation of the Rijndael algorithm. Accordingly, the loading and input of the data, and the process of the round operations are performed at the same time, and the Rijndael algorithm is rapidly implemented by parallel processing of the round operations following the two separate routines.

Since the initial round key adder is additionally provided to process the initial round, the Rijndael encryption or decryption apparatus obtains the increased throughput. Since the data are divided and processed in parallel, the data processing modules require less resource. Accordingly, the data processing speed is high even in the resource-constrained environment, for example, in smart cards.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An encryption and decryption apparatus, comprising:
 a round key generator generating at least one round key for iterative operations in each of a plurality of rounds using an input key for one of the encryption or decryption;

an initial round key adder receiving a plurality of divided parts of an input data, consecutively receiving a plurality of parts of the at least one round key which is output from the round key generator for an initial round and corresponds to each of the divided parts of the input data, and adding the divided parts of the input data and the corresponding part of the at least one round key;

a first operator receiving a first data which is output from the initial round key adder and a second part of the at least one round key which is output from the round key generator and performing operations for the one of the encryption or decryption;

a second operator receiving a second data which is output from the initial round key adder and a third part of the round key which is output from the round key generator, and performing operations for the one of the encryption or decryption; and a register part temporarily storing the first data which is output from the first operator and the second data which is output from the second operator, inputting the first and second data to the first and second operators, respectively, for operations of a next round among the plurality of the rounds, and outputting an encrypted or decrypted data when the plurality of the rounds are completed, wherein the first operator and the second operator perform the one of the encryption or decryption in parallel, and wherein the first operator comprises:

a first byte substitution part receiving any one of output data from the initial round key adder or the register part and performing one of a Rijndael byte substitution operation or a Rijndael inverse byte substitution operation for the one of the encryption or decryption, respectively;

a first column mixer receiving an output data from the first byte substitution part and performing on of a Rijndael mixed columns operation or a Rijndael inverse mixed columns operation for the encryption and decryption, respectively;

a first round key adder receiving any one of output data from the first column mixer or the first byte substitution part, receiving a fourth part of the at least one round key from the round key generator, and performing a round key addition operation; and a third selector which selectively receives output data from the first column mixer and the first byte substitution part and selectively inputs the output data to the first round key adder or the second operator.

2. The encryption and decryption apparatus of claim 1, wherein the first and second operators perform the operations according to a Rijndael encryption or decryption algorithm.

3. The encryption and decryption apparatus of claim 1, wherein the first operator further comprises a first selector which receives output data from the initial round key adder and the register part and selectively inputs any one of the output data to the first byte substitution part.

4. The encryption and decryption apparatus of claim 1, wherein the third selector selects and inputs the output data of the first byte substitution part to the first round key adder at a final round among the plurality of the rounds.

5. The encryption and decryption apparatus of claim 1, wherein the second operator comprises:

a second byte substitution part receiving output data of the register part and performing one of a Rijndael byte substitution operation or a Rijndael inverse byte substitution operation for the one of the encryption or decryption;

a second column mixer receiving output data of the initial round key adder and performing a Rijndael mixed columns operation or a Rijndael inverse mixed columns operation for the encryption and decryption, respectively; and a second round key adder receiving any one of output data from the first operator or the second column mixer, receiving a fourth part of the round key from the round key adder, and performing a round key addition operation.

6. The encryption and decryption apparatus of claim 5, wherein the second operator further comprises a second selector which receives output data from the second column mixer and the second byte substitution part and selectively inputs any one of the output data to the second round key adder.

7. The encryption and decryption apparatus of claim 6, wherein the second selector selects and inputs the output data of the second byte substitution part to the second round key adder at a final round among the plurality of the rounds.

8. The encryption and decryption apparatus of claim 1, wherein the register part comprises:

at least one register storing the first data and the second data; and a selector receiving the first and second data from the register and selectively outputting the encrypted or decrypted data.

9. The encryption and decryption apparatus of claim 8, wherein the register part comprises first to sixteenth registers.

10. The encryption and decryption apparatus of claim 9, wherein the first to fourth registers receive output data from the first operator, and the fifth to eighth registers receive output data from the second operator.

11. The encryption and decryption apparatus of claim 9, wherein the data stored in the first to eighth registers are input to the ninth to sixteenth registers when next round data is input in the first to eighth registers.

12. The encryption and decryption apparatus of claim 9, wherein the data stored in the ninth to sixteenth registers are processed through a Rijndael shift row operation by the selector, and an output data of the selector is input to the first operator and the second operator.

13. The encryption and decryption apparatus of claim 1, wherein the a size of the input data is 128 bits, and the input data is divided into four 32-bit columns and is consecutively input to the initial round key adder.

14. A method of encrypting and decrypting data, comprising:

receiving data to be encrypted or decrypted;

performing preprocessing of the received data by performing a shift row operation of a Rijndael (AES) for encryption or an inverse shift row operation of the Rijndael (AES) for decryption;

performing a key schedule to calculate an initial key for encryption or decryption rounds to be added to the received data;

performing loading of the preprocessed data, and adding the loaded data to the calculated initial key;

performing a first round of the encryption or decryption rounds while loading the preprocessed data by performing the Rijndael (AES) for each one fourth of the preprocessed data and storing resulting data in state bytes array storage to perform a data permutation operation;

performing remaining rounds of the encryption or decryption rounds for each one half of data output from the state bytes array storage and storing the resulting data in the state bytes array storage to perform the data permutation operation, thereby outputting the resulting data, wherein the remaining rounds of encryption or decryption operations are performed in parallel for each one half of the data output form the state bytes array storage, wherein the first round of the encryption or decryption rounds are performed on a first operator, and wherein the first operator comprises:

a first byte substitution part receiving any one of output data from an initial round key adder or a register part and performing one of a Rijndael byte substitution operation or a Rijndael inverse byte substitution operation for the one of the encryption or decryption, respectively;

a first column mixer receiving an output data from the first byte substitution part and performing one of a Rijndael mixed columns operation or a Rijndael inverse mixed columns operation for the encryption and decryption, respectively;

a first round key adder receiving any one of output data form the first column mixer or the first byte substitution part, receiving a fourth part of the at least one round key from a round key generator, and performing a round key addition operation; and a third selector which selectively receives output data from the firs column mixer and the first byte substitution part and selectively inputs the output data to the first round key adder or a second operator.

15. The method of encrypting and decrypting data of claim 14, wherein the data permutation operation performed by the state bytes array storage includes:

receiving a first data to be stored;

storing the received first data into a first plurality of registers of the state bytes array storage;

receiving a second data to be stored;

storing the received second data into the first plurality of registers while saving the stored first data in the first plurality of registers into a second plurality of registers of the state bytes array storage;

selecting output data from the first and the second plurality of the registers to produce first and second columns of the state bytes array according to the shift row or the inverse shift row operation of Rijndael (AES) encrypting or decrypting, respectively, thereby outputting the first and the second columns;

partially updating the second plurality of registers while loading new data into the first plurality of the registers;

selecting output data from the second plurality of registers to produce third and fourth columns of the state bytes array according to the shift row or inverse shift row operation of Rijndael (AES) encrypting or decrypting, respectively, thereby outputting the third and the fourth columns.

16. The method of encrypting and decrypting data of claim 14, wherein the first round of the encryption or decryption rounds includes:

performing a byte substitution or an inverse byte substitution operation on each one fourth of the loaded data;

performing a mix columns or an inverse mix columns operation;

performing a round key addition operation; and storing the resulting data of above operations in the state bytes array storage.

17. The method of encrypting and decrypting data of claim 14, wherein the remaining rounds of the encryption or decryption round includes:

performing the shift row or the inverse shift row operation on the stored data;

performing a mix columns or an inverse mix columns operation;

performing a round key addition operation; and storing the resulting data of above operations in the state bytes array storage.

18. A data encryption system, comprising:

an input unit dividing input data into n-bit segments;

a round key generator receiving a master key and generating n-bit round keys corresponding to each round stage of an encryption process;

a first key adder which adds each of the n-bit segments with a first one of the n-bit round keys;

a first operator which performs a partial encryption operation on each of the added n-bit segments and adding a second one of the n-bit round keys to selected results of the partial encryption operation;

a second operator which performs a second encryption operation by using selected ones of the partial encryption results and a third one of the n-bit round keys; and a register part temporarily storing each n-bit output from the first operator and each n-bit output from the second operator, feeding back each n-bit output from the first and second operators to the first and second operators, respectively, for operations of a next round stage, and combining each of the n-bit outputs to form an encrypted result when each round stage is complete, wherein the first and second operators perform the encryption operations in parallel, and wherein the first operator comprises:

a first byte substitution part receiving any one of output data from the initial round key adder or the register part and performing one of a Rijndael byte substitution operation or a Rijndael inverse byte substitution operation for the one of the encryption or decryption, respectively;

a first column mixer receiving an output data from the first byte substitution part and Performing one of a Rijndael mixed columns operation or a Rijndael inverse mixed columns operation for the encryption and decryption, respectively;

a first round key adder receiving any one of output data from the first column mixer or the first byte substitution part, receiving a fourth Part of the at least one round key from the round key generator, and performing a round key addition operation; and a third selector which selectively receives output data from the first column mixer and the first byte substitution part and selectively inputs the output data to the first round key adder or the second operator.

19. The system of claim 18, wherein the first operator adds the second one of the n-bit round keys to odd n-bit segments.

20. The system of claim 19, wherein the second operator uses the selected ones of the partial encryption results which correspond to even n-bit segments.

21. The system of claim 18, wherein the first and second operators perform the encryption operations according to a Rijndael encryption algorithm.

22. A method of encrypting data via parallel processing, comprising:

dividing input data into sequential n-bit segments;

generating n-bit round keys corresponding to a number of encryption rounds;

adding a first one of the n-bit round keys to each of the n-bit segments;

performing first encryption round operations on odd n-bit segments using a second one of the n-bit keys until the number of encryption rounds is complete;

performing second encryption round operations on even n-bit segments in parallel with the performing the first encryption round operations using a third one of the n-bit keys until the number of encryption rounds is complete; and combining results from the first encryption round operations and the second encryption round operations to form an enciphered output, wherein the first encryption round operations are performed on a first operator, and wherein the first operator comprises:

a first byte substitution part receiving any one of output data from an initial round key adder or a register Part and performing one of a Rijndael byte substitution operation or a Rijndael inverse byte substitution operation for the one of the encryption or decryption, respectively;

a first column mixer receiving an output data from the first byte substitution part and performing one of a Rijndael mixed columns operation or a Rijndael inverse mixed columns operation for the encryption and decryption, respectively;

a first round key adder receiving any one of output data from the first column mixer or the first byte substitution part, receiving a fourth part of the at least one round key from a round key generator, and performing a round key addition operation; and a third selector which selectively receives output data from the first column mixer and the first byte substitution part and selectively inputs the output data to the first round key adder or a second operator.

23. The method of claim 22, wherein the first encryption round operations and the second encryption round operations are performed according to the Rijndael encryption algorithm.

24. The method of claim 23, wherein the first encryption round operations and the second encryption round operations are performed simultaneously.

25. The method of claim 22, wherein the first encryption round comprises:

performing a byte substitution operation of each of the odd n-bit segments;

performing a mix columns operation of each of the odd n-bit segments; and performing a round key addition operation using the second n-bit round key.

26. The method of claim 25, wherein the second encryption round comprises:

performing the byte substitution operation of each of the even n-bit segments;

performing the mix columns operation of each of the even n-bit segments; and performing the round key addition operation using the third n-bit round key.

27. The method of claim 22, wherein the first encryption round comprises:

performing a byte substitution operation of each of the odd and the even n-bit segments;

performing a mix columns operation of each of the odd and the even n-bit segments; and performing a round key addition operation using the second n-bit round key and the odd n-bit segments.

28. The method of claim 27, wherein the second encryption round comprises:

receiving the even n-bit segments after the performing the mix columns operation of each of the odd and the even n-bit segments;

performing the byte substitution operation of each of the received even n-bit segments;

performing the mix columns operation of each of the received even n-bit segments; and performing the round key addition operation using the third n-bit round key.

29. The method of claim 28, wherein the combining the results from the first encryption round operations and the second encryption round operations to form an enciphered output comprises storing partial results corresponding to each round of the first encryption round and the second encryption round; and forming the enciphered output based on the stored partial results.

30. The method of claim 29, wherein the performing the mix columns operation on the odd and the even n-bit segments is not performed during a last of the encryption rounds.

31. The method of claim 29, wherein the first encryption round operations and the second encryption round operations are processed via the parallel processing such that the results are obtained quickly.

* * * * *

UNITED STATES PATENT AND TRADEMARK OFFICE
CERTIFICATE OF CORRECTION

PATENT NO. : 7,639,797 B2
APPLICATION NO. : 11/000496
DATED : December 29, 2009
INVENTOR(S) : Kyung-hee Lee et al.

It is certified that error appears in the above-identified patent and that said Letters Patent is hereby corrected as shown below:

Column 11, Line 35, change "on" to --one--.

Column 12, Line 42, after "wherein" delete "the".

Column 13, Line 3, change "form" to --from--.

Column 13, Line 23, change "firs" to --first--.

Column 14, Line 35, change "Performing" to --performing--.

Column 15, Line 11, change "Part" to --part--.

Column 16, Line 31, after "comprises" insert --:--.

Signed and Sealed this

Sixteenth Day of March, 2010

David J. Kappos
*Director of the United States Patent and Trademark Office*